United States Patent [19]

Hudgin

[11] 4,024,325

[45] May 17, 1977

[54] PROCESS FOR PREPARING ETHYLENE-CARBON MONOXIDE COPOLYMERS USING PEROXYESTERS HAVING A TEN-HOUR HALF-LIFE LOWER THAN 60° C

[75] Inventor: Donald E. Hudgin, Princeton Junction, N.J.

[73] Assignee: Atlantic Richfield Company, Los Angeles, Calif.

[22] Filed: Oct. 14, 1975

[21] Appl. No.: 622,193

Related U.S. Application Data

[63] Continuation-in-part of Ser. No. 496,497, Aug. 12, 1974, abandoned.

[52] U.S. Cl. .............................................. 526/11.1
[51] Int. Cl.$^2$ .................... C08G 2/00; C08G 4/00; C08G 67/02
[58] Field of Search ............... 260/63 CQ; 526/11.1

[56] References Cited

UNITED STATES PATENTS

| | | | |
|---|---|---|---|
| 2,495,286 | 1/1950 | Brubaker | 260/63 CQ |
| 2,680,763 | 6/1954 | Brubaker | 260/63 CQ |
| 3,420,807 | 1/1969 | Harrison et al. | 260/92.8 R |

OTHER PUBLICATIONS

"Organic Peroxides", vol. I, Swern Editor, John Wiley Pub. 1970, pp. 81–87.
*Polymer Handbook*, Editors J. Brandrup et al., pp. II--1,39,40 Interscience Publ.

*Primary Examiner*—Joseph L. Schofer
*Assistant Examiner*—Herbert J. Lilling
*Attorney, Agent, or Firm*—Coleman R. Reap

[57] ABSTRACT

High melting ethylene-carbon monoxide copolymers are prepared by copolymerizing ethylene and carbon monoxide at relatively low temperatures and pressures using a peroxy ester of an organic acid having a ten hour half-life temperature of about 60° C. or less, when determined in a 0.2 M solution in benzene, as catalyst. The preferred catalyst is t-butyl peroxypivalate. The reaction is preferably carried out in the presence of dioxane as solvent and t-butyl peroxypivalate as catalyst.

17 Claims, No Drawings

PROCESS FOR PREPARING ETHYLENE-CARBON MONOXIDE COPOLYMERS USING PEROXYESTERS HAVING A TEN-HOUR HALF-LIFE LOWER THAN 60° C

BACKGROUND OF THE INVENTION

This is a continuation-in-part of application Ser. No. 496,497, filed Aug. 12, 1974 and now abandoned.

This invention relates to ethylene-carbon monoxide and more particularly to an improved process for preparing ethylene-carbon monoxide copolymers.

Ethylene-carbon monoxide copolymers have been known for several years and have been of considerable interest because of their potential value as engineering plastics. Ethylene-carbon monoxide copolymers having high carbon monoxide contents, particularly 40% or more, are especially interesting because they possess high melting points and other superior properties which would make them very suitable for many engineering applications. Ethylene-carbon monoxide copolymers are also of interest since carbon monoxide is a very inexpensive by-product obtained in the manufacture of steel and is, therefore, unlike most other monomeric materials used in the production of synthetic polymers, not derived from petroleum. In spite of the great potential of these copolymers, their development has been slow and they have not yet gained commercial acceptance. The principal reason for this is that no commercially feasible process for their production has been developed.

The preparation of high molecular weight ethylene carbon-monoxide copolymers has been accomplished by gamma radiation initiation but this method requires the use of expensive equipment, high pressures, and inordinantly long reaction times. Furthermore, polymer produced by this method may be partially crosslinked and, thus, very difficult to process. Since chemical catalysis offers more advantages and fewer hazards than radiation initiation, considerable effort has been made to develop useful chemical catalytic processes for the production of ethylene-carbon monoxide copolymers.

U.S. Pat. No. 2,495,286, issued to Brubaker, discloses the use of organic peroxides as a catalyst for the preparation of ethylene-carbon monoxide copolymers. As shown in this patent and other patents such as the Nozaki patents, U.S. Pat. Nos. 3,689,460 and 3,694,412, very high pressures, on the order of 500 atmospheres or more and high temperatures are required for the preparation of normally solid polymers when using peroxide catalysts. Furthermore, the total polymer yield and carbon monoxide content are quite low when the catalysts disclosed by Brubaker are used in the preparation of ethylene-carbon monoxide copolymers. This is unfortunate since it has been determined that ethylene-carbon monoxide copolymers having ethylene:carbon monoxide ratios close to unity have the most desirable physical properties and a higher degree of crystallinity than those containing lower carbon monoxide contents. It would be highly desirable to develop a process for preparing high melting ethylene-carbon monoxide copolymers in high yield and with high carbon monoxide contents without the necessity of resorting to the use of high pressures and temperatures.

SUMMARY OF THE INVENTION

An improved process for preparing ethylene-carbon monoxide copolymers has now been discovered by which copolymers having high melting points and high carbon monoxide contents can be produced in good yields at relatively low temperatures and moderate pressures.

Accordingly, it is an object of the invention to present an improved process for preparing ethylene-carbon monoxide copolymers. It is another object of the invention to present a process for preparing ethylene-carbon monoxide having increased carbon monoxide content. It is another object of the invention to present a process for preparing high melting ethylene-carbon monoxide copolymers without resorting to the use of high temperatures or pressures. It is another object of the invention to present a process for preparing ethylene-carbon monoxide in improved yields. These and other objects will become more readily apparent from the following description and examples.

The above objects are accomplished by copolymerizing ethylene and carbon monoxide in the presence of a peroxy ester of an organic acid having a ten hour half-life temperature of 60° C. or less, when measured in benzene at a concentration of 0.2 molar, as catalyst. The catalyst may be used at any concentration which is effective to produce the desired results and the desired catalyst concentration usually varies from about 0.005 to 5.0% and preferably from about 0.1 to 2.0%, based on the total weight of monomeric components present in the reaction mixture. The reaction may be carried out with or without a solvent or diluent for the monomers. In a preferred embodiment the reaction is conducted in the presence of t-butyl peroxypivalate and a cyclic ether diluent, most preferably dioxane.

DESCRIPTION OF THE INVENTION

The reaction between the ethylene and the carbon monoxide may be carried out under batch or continuous conditions, but for convenience the invention will be described as it applies to a batch type process. The reaction is preferably carried out in a reaction vessel which can withstand high pressures and the corrosive effects of carbon monoxide. Stainless steel or glass lined reactors are generally considered to be suitable materials for the inside surfaces of the reactor.

In a typical operation for preparing ethylene-carbon monoxide copolymer a solvent, if one is used, is added to the reaction vessel and an inert gas, such as nitrogen, is passed through the reactor to remove oxygen. The peroxy ester catalyst and any desired polymerization modifiers or other additives are next and pressured into the reaction vessel. The vessel is then closed and pressured with an ethylene-carbon monoxide gas mixture. Heat is then applied to the reaction vessel to initiate the reaction and the vessel contents are heated to and maintained at the desired temperature until the reaction is completed. The pressure is maintained by introducing additional ethylene and carbon monoxide from time to time as they are used up in the reaction. When the polymerization is completed, the reactor contents are cooled and the solvent is separated from the polymer by any desired method, for example, by distillation, and the polymeric product is recovered.

The ratio of ethylene to carbon monoxide in the reaction vessel may vary depending upon the type of product being prepared. When preparing copolymers with substantial carbon monoxide contents, the weight ratio of ethylene to carbon monoxide is desirably maintained in the range of about 4:1 to 1:4. The gas charge may contain inert gases such as nitrogen which serves as a gaseous diluent or it may contain only ethylene and carbon monoxide. In the latter case the gas charge preferably contains about 80 to 20% ethylene and about 20 to 80% carbon monoxide. The ratio of ethylene and carbon monoxide may be varied as the polymerization reaction proceeds, if desired. In this way the constitution of the polymer chains can be varied.

Other ethylenically unsaturated monomers which polymerize with ethylene and/or carbon monoxide can be included in the reaction mixture formulation to modify the properties of the polymeric product. Includable as suitable monomers are alkenes containing 3 to 8 carbon atoms such as propylene, isobutylene, hexene, etc.; cycloaliphatic compounds such as cyclohexene, etc.; aromatic substituted alkenes such as styrene, etc.; acrylic compounds such as acrylic or methacrylic acid, acrylonitrile, etc.; vinyl esters such as vinyl acetate, etc.; vinyl halides such as vinyl chloride, vinylidene chloride, etc.; dienes such as butadiene, isoprene, 2-chloro-butadiene, etc. The amount of other polymerizable monomer or monomers used in the ethylene-carbon monoxide reaction mixture will be determined by the properties desired in the product. In general, if other polymerizable monomeric compounds are included in the formulation, it is preferred to limit the quantity of such other compounds to minor amounts such as up to about 45% based on the total weight of monomeric components present in the reaction mixture.

The catalysts which have been found to produce the unexpected results of the present invention are the peroxy esters of organic acids having a ten hour half-life temperature not greater than 60° C., determined in a 0.2 M benzene solution. It has been determined that catalysts having a ten hour half-life temperature greater than 60° C. do not produce the unexpectedly superior results obtained when using the catalysts of this invention. Included in the class of peroxy ester compounds found suitable are the monoperoxy esters such as t-butyl peroxypivalate, etc., and the diperoxy esters such as 2,5-dimethylhexane-2,5-diperoxyneopentane. These compounds can be prepared by well known procedures and some of them are established commercial products. The preferred peroxy ester catalyst is tertiary butyl peroxypivalate.

The catalyst concentration may vary depending upon the properties desired in the product and the temperature at which the reaction is to be carried out. In general, the catalyst is effective at concentrations as low as about 0.005% based on the total weight of polymerizable monomer present and amounts up to about 5% or more will produce the desired result. It is preferred to use the catalyst at a concentration of about 0.1 to 2%, based on the total weight of polymerizable monomer present in the reaction mixture.

A cocatalyst may be used, if desired, in conjunction with the peroxy ester catalyst. The useful concentration of the cocatalyst can vary from about 0.01 to 5.0%, based on the total weight of polymerizable monomers present in the reaction mixture. Suitable cocatalysts include other free radical compounds such as other organic peroxides, e.g., benzoyl peroxide, lauroyl peroxide, etc., and azo compounds such as 2,2′-azobis(isobutyronitrile), etc.

Solid ethylene-carbon monoxide copolymers which are useful as engineering plastics may be prepared at pressures as low as about 300 psig. This is surprising since, as pointed out above, pressures of at least 500 atmospheres are required when using other peroxide catalysts. In general, it has been observed that higher molecular weight polymers are obtained by carrying out the reaction at higher pressures and, accordingly, pressures as high as 3000 atmospheres can be used if desired. However, high molecular weight copolymers are obtained using the disclosed catalyst at moderate pressures an it is not generally necessary nor desirable that the reaction pressure exceed about 2000 psig. In the preferred embodiment the pressure is maintained in the range of about 500 to 1500 psig.

The temperature at which the reaction is carried out may vary depending upon the other reaction conditions and the type of product desired. The use of tertiary peroxy esters of organic acids having ten hour half-lives at about 60° C. or less (determined in 0.2 M benzene solution) permits the use of lower temperatures than is desirable when using other less active peroxide catalysts. The temperature is usually maintained between about 20° and 100° C. and preferably between about 20° and 70° C. during the polymerization reaction since more gel-free higher molecular weight polymers are obtained at lower temperatures.

The reaction may be carried out either in the presence of or the absence of a solvent or diluent for the reactants. In general, it is preferable to use a solvent or diluent to prevent local heat buildup and to reduce the viscosity of the polymerizing mass. Solvents or diluents used are desirably volatile so that they can be more easily removed from the polymeric product. Suitable solvents and diluents include aliphatic, cycloaliphatic, and aromatic hydrocarbons such as isooctane, cyclohexane, benzene, etc.; ethers such as dioxane, propylene oxide, etc.; and other organic or inorganic liquids which are free of substituents or impurities which interfere with the desired reaction between the ethylene and the carbon monoxide. Two or more solvents and/or diluents can be used in combination in the process of the invention.

In a preferred embodiment of the invention a cyclic ether is used as the solvent. Particularly preferred cyclic ethers are dioxane and propylene oxide. It has been discovered that high product yields can be obtained when the reaction is carried out in the presence of dioxane as the solvent and tertiary butyl peroxypivalate as the catalyst. As stated above, the cyclic ether can also be used in combination with other solvents or diluents.

Other additives such as plasticizers antioxidants, molecular weight regulators, coloring agents fillers, lubricants, etc. may be incorporated into the formulation prior to, during or subsequent to the polymerization reaction. It is usually more efficient and economical to incorporate fillers and other inert materials into the polymerized product in a post polymerization blending operation.

The following examples illustrate preferred embodiments of the invention. Unless otherwise indicated, parts and percentages are on a weight basis.

EXAMPLE I

A 1 liter Parr Instrument Company reactor (Model 4521) is charged with 500 ml. pure n-hexane and 2 grams of a 75% solution of t-butyl peroxypivalate in mineral spirits. t-Butyl peroxypivalate has a 10 hour half-life of 55° C. in a 0.2 M benzene solution. (Swern, "Organic Peroxides", John Wiley and Sons, 1970, Vol. 1, pp 82, 87). The reactor is sealed and purged with prepurified nitrogen. The reactor is then pressurized with a purified 70/30 carbon monoxide/ethylene mixture to 500 psig. With stirring the temperature is raised to 66° C. and the pressure increased to 610 psig. The pressure is raised to 700 psig by further pressurizing with a purified 25/75 carbon monoxide/ethylene mixture. For 12 hours and 25 minutes, the temperature is maintained between 62° and 67° C. while the pressure was maintained between 640 and 700 psig by periodically repressurizing to 700 psig with the 25/75 gas mixture. The reactor is allowed to cool to room temperature and is then depressurized. The hexane is evaporated, leaving 33.4 grams of copolymer, having a melting range 135°–145° C. and an oxygen content of 25.53%, which calculates to 44.68% carbon monoxide in the copolymer. A disc, prepared by compression molding of the copolymer has a Shore D hardness of 50.

EXAMPLE II

The procedure of Example I is repeated except that 500 ml. of acetonitrile is used in place of the hexane. The copolymer product is dark grey in color and weighs 26.4 g. It has a carbon monoxide content of 45.8% and a melting range of 180°–185° C. A disc, prepared by compression molding the copolymer, has a Shore D hardness of 63.

EXAMPLE III

The procedure of Example I is repeated except that 800 ml. hexane is used instead of 500 ml. The copolymer product weighs 20.9 g., is dark in color, and has a carbon monoxide content of 47.0% and a melting range of 155°–160° C.

EXAMPLE IV

The procedure of Example I is repeated except that the 500 ml. hexane is replaced with 250 ml. hexane and 250 ml. distilled water. The copolymer product, a white powder, melts at 140°–145° C., has a carbon monoxide content of 45.5% and weighs 11.7 g.

EXAMPLE V

The procedure of Example I is repeated except that a pressure range of 890–945 psig is used. The copolymer product, a grey colored powder, melts at 160°–165° C. and has a carbon monoxide content of 45.5% and weighs 19.9 g.

EXAMPLE VI

The procedure of Example I is repeated except that a pressure range of 365–420 psig is used. The copolymer, a grey colored powder, weighs 13.0 g., has a melting range of 140°–145° C. and a carbon monoxide content of 44.6%.

Examples I to VI illustrate specific embodiments of the invention wherein the catalyst is t-butyl peroxypivalate and reaction pressure and solvent are varied. These Examples show that high melting ethylene-carbon monoxide copolymer can be obtained when ethylene and carbon are copolymerized at moderate pressures using a peroxy ester of an organic ester having a 10 hour half-life of about 60° C. or less (determined in 0.2 M benzene solution) as the catalyst.

EXAMPLE VII

The procedure of Example I is repeated using 2,5-dimethylhexane-2,5-diperoxyneopentanoate (ten hour half-life temperature of 51° C. in 0.2 M benzene solution, see "Modern Plastics", Vol. 48, Nov. 1971, p 67, Table II) as catalyst in place of the t-butyl peroxypivalate. The resulting polymer will have a melting range and carbon monoxide content typical of useful ethylene-carbon monoxide copolymers.

EXAMPLE VIII

The reaction vessel described in Example I is charged with 500 ml. of dioxane and 1 gm. of tertiary butyl peroxy pivalate. The reactor is sealed and purged with nitrogen for one-half hour. The reactor is then pressurized to 1000 psig with a 75/25 mixture of ethylene and carbon monoxide. The reactor contents are heated to and maintained at 57° to 79° C. and the pressure is maintained between 740 and 1180 for 24 hours by periodic repressurization with a 75/25 mixture of ethylene and carbon monoxide. The reactor contents are continuously agitated during this period. The reactor is then allowed to cool to room temperature and depressurized. The dioxane is evaporated leaving 93.4 gms. of copolymer having a melting range of 130°–135° C. and an oxygen content of 23.64%, which is equivalent to a carbon monoxide content of 41.4%.

EXAMPLE IX

The procedure of Example VII is repeated except that benzene is used as the solvent instead of dioxane. The yield is 38.6 gms. of copolymer having a melting range of 145°–150° C. and an oxygen content of 24.28%, which is equivalent to a carbon monoxide content of 42.5%. Similar results are observed when runs made using dioxane as the solvent are compared with runs made using xylene, hexane, cyclohexane, and water as the solvent.

Exampls VIII and IX illustrate that unexpectedly high yields are obtained when dioxane is used as the solvent in the copolymerization of ethylene and carbon monoxide using tertiary butyl peroxy pivalate as the catalyst.

Although the invention has been described with particular reference to specific examples, the scope of the invention is not limited thereto but is defined by the breadth of the appended claims.

I claim:
1. An improved process for preparing ethylene-carbon monoxide copolymers comprising reacting a mixture of ethylene and carbon monoxide in the presence of a peroxy ester of an organic acid having a ten hour half-life temperature, determined in 0.2 M benzene solution, not greater than about 60° C.
2. The process of claim 1 wherein the peroxy ester of an organic acid is present in an amount effective to produce the desired result up to about 5%, based on the total weight of monomeric components.
3. The process of claim 1 wherein the reaction is carried out at a pressure of about 300 to 2000 psig.
4. The process of claim 1 wherein the reaction is carried out at a pressure of about 500 to 1500 psig.
5. The process of claim 1 wherein the reaction is carried out in the presence of a solvent free of substituents which interfere with the desired reaction between the ethylene and the carbon monoxide.
6. The process of claim 5 wherein the solvent is a cyclic ether.

7. The process of claim 1 wherein at least one additional ethylenically unsaturated monomer polymerizable with ethylene, carbon monoxide or mixtures thereof is added to the reaction mixture.

8. The process of claim 1 wherein the reaction is carried out at a temperature of about 20° to 100° C.

9. The process of claim 1 wherein the ratio of ethylene to carbon monoxide in the reaction mixture is about 1:4 to 4:1.

10. The process of claim 1 wherein the peroxy ester of an organic acid is t-butyl peroxypivalate.

11. An improved process for preparing ethylene-carbon monoxide copolymers comprising reacting a mixture of ethylene and carbon monoxide in dioxane in the presence of 0.005 to 5.0%, based on the total weight of monomeric components, of t-butyl peroxypivalate at a pressure of about 300 to 2000 psig and a temperature of about 20 to 100° C.

12. The process of claim 11 wherein the reaction is carried out in a mixture of dioxane and another diluent.

13. The process of claim 11 wherein up to about 45% of the total weight of monomer present in the reaction mixture is an ethylenically unsaturated monomer copolymerizable with ethylene and/or carbon monoxide.

14. The process of claim 11 wherein the t-butyl peroxypivalate is present in an amount of about 0.1 to 2%, based on the total weight of polymerizable monomer present in the reaction mixture.

15. The process of claim 11 wherein the reaction is carried out at a pressure of about 500 to 1500 psig.

16. The process of claim 11 wherein the reaction is carried out at a temperature of about 20° to 70° C.

17. The process of claim 11 wherein the ratio of ethylene to carbon monoxide in the reaction mixture is about 1:4 to 4:1.

* * * * *